United States Patent Office 2,987,359
Patented June 6, 1961

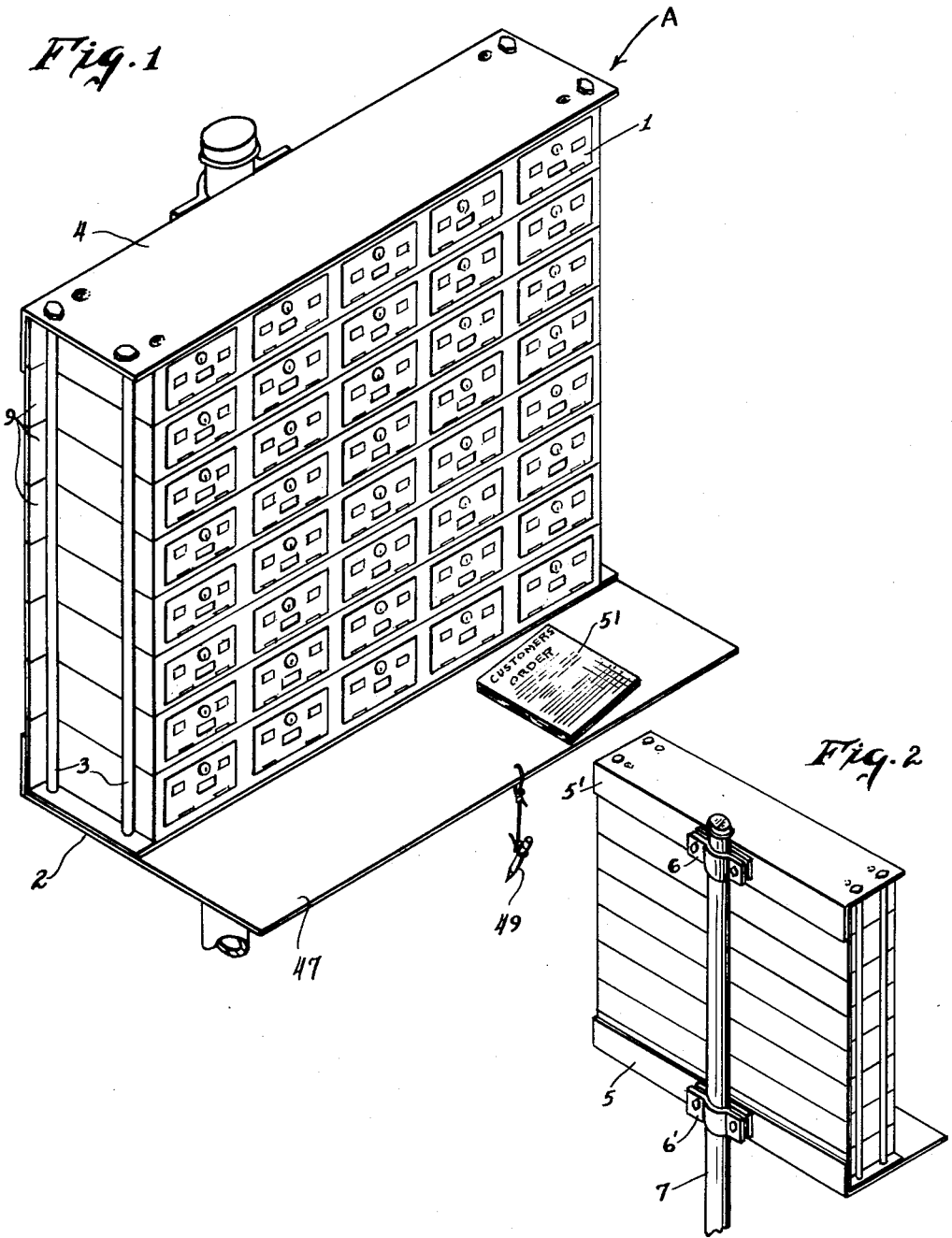

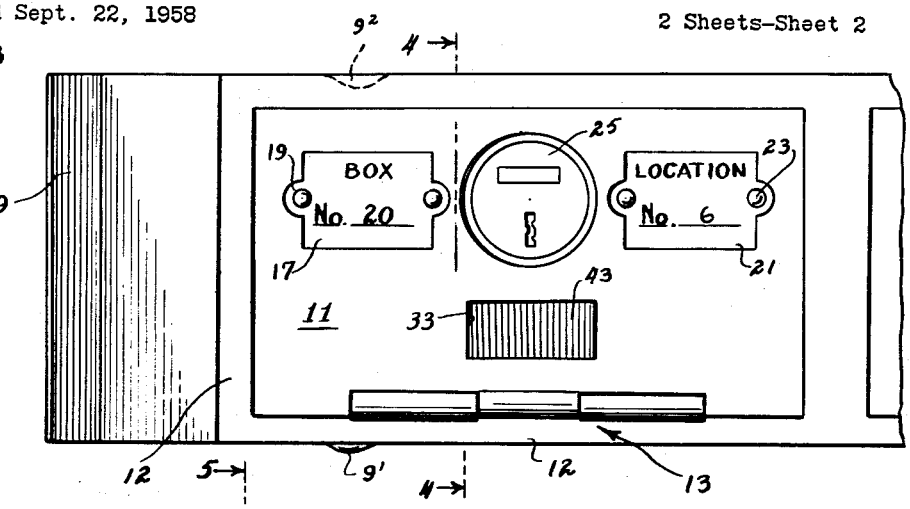
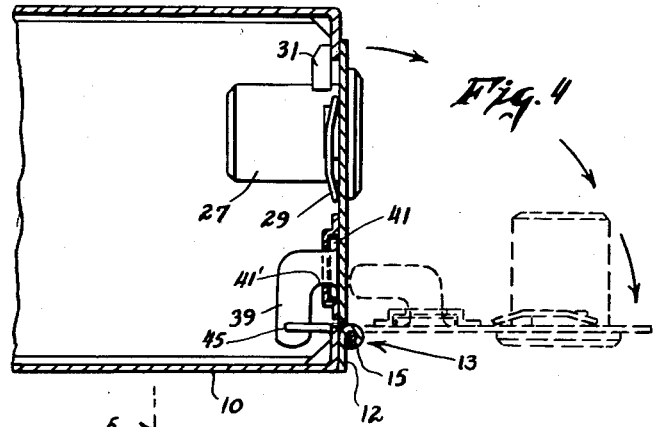
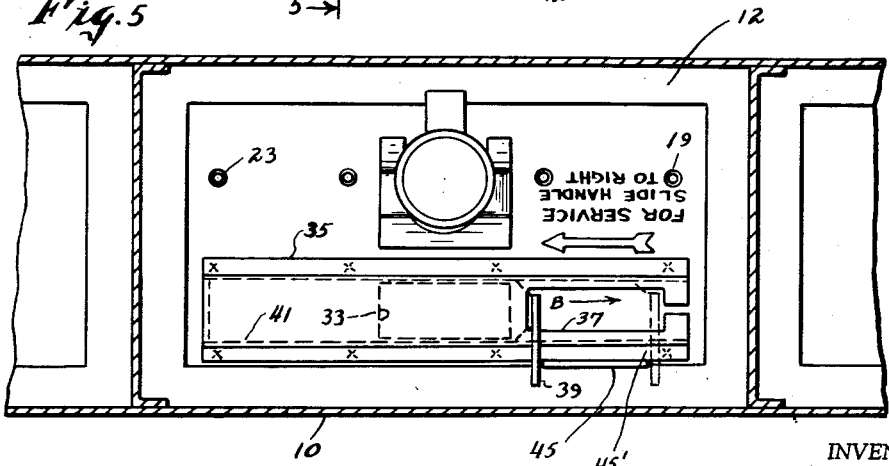

2,987,359
AUTOMATIC CAR SERVICING DEVICE
Patrick A. R. Kennon, 110 Riverside Drive,
New York 24, N.Y.
Filed Sept. 22, 1958, Ser. No. 762,653
1 Claim. (Cl. 312—234)

The present invention relates to automatic servicing devices, and in particular to a device for servicing cars and other motor vehicles.

In large parking areas which accommodate several hundred cars and other motor vehicles and which are provided with service facilities for servicing and repairing motor vehicles, it is frequently necessary for the owners of cars or vehicles to have their cars serviced while they are left in the parking area. In situations where a number of drivers or car owners arrive in a parking area at the same time, as for example when this parking area adjoins a large industrial plant, it is impossible to order service due to the limited number of personnel employed at the service station, or at best, considerable time delays occur while the car owners await their turn to place their orders. This is particularly inconvenient for employees of such an industrial plant who have to report to work at a specified time and have little of it to spare upon arrival.

An important object of the present invention, therefore, is to provide a device which will make it possible to service cars or other motor vehicles at a service center without the necessity of personal contact between the service center's attendant and the driver or owner of said car or vehicle.

Another object of the invention is to provide such a device which is automatic in operation and which requires no previous training on the part of the service center's attendant or the car owner or driver, preliminary to its use.

A further object of the invention is to provide a plurality of compartments, wherein may be deposited written service requests, said compartments being provided with means indicating the presence of such requests.

Still another object of the invention is to provide means for automatically locking said compartments to prevent said requests from being misplaced and to provide privacy for the persons using the device.

Another object of the invention is to provide such a device which is simple in construction and inexpensive to manufacture.

Other objects and advantages of the invention will become apparent from the reading of the specification when taken in connection with the accompanying drawings.

The invention will now be more fully described with reference to the accompanying drawings, but it should be understood that this is given by way of illustration and not of limitation, and that many changes can be made in the details without departing from the spirit of the invention.

In the drawings, wherein like numerals refer to like parts,
FIG. 1 is a front perspective view of the device;
FIG. 2 is a rear perspective view thereof;
FIG. 3 is a perspective front view of one of the units comprising the device;
FIG. 4 is a cross-section of the unit shown in FIG. 3, taken on line 4—4 of that figure; and
FIG. 5 is a view of the unit of FIG. 4, viewed in the direction of the arrows on cross-section 5—5 of FIG. 4.

Referring now to the drawings in details, there is shown in FIGS. 1 and 2 a battery or assembly A of laterally joined lock boxes 1 including a bottom panel 10, which are arranged in vertical rows on a support 2 formed with a flange 5 and are held in place by means of clamping bolts 3 and plate 4 which is provided with a flange 5'. The entire battery or assembly is secured by projecting flanges 5 and 5' and clamps 6 and 6' to a post 7 which may be anchored in the ground by known means. The opposite ends of each row of boxes are provided with flanges 9 which, when clamped between flanges 5 and 5' and one of the bolts 3, prevent lateral and forward displacement of the boxes. To effect the alignment of the superimposed boxes, each row of these is provided at the bottom end portions with projections 9' and complementary recesses $9^2$ at the top.

As shown in FIG. 3, each of the boxes comprises a door 11, provided with a hinge 13 swingable on pin 15 outwardly from the front panel 12. As will be noted from FIG. 4, the door hinges are located near the bottom edge of each respective box, so that when swung out, they are held in open position, by their own weight. The exterior face of each door is provided with a box number tag 17 secured to the door by means of fasteners 19, and with a location number tag 21 similarly secured by means of fasteners 23 to the door. Arranged centrally between both tags is a lock 25, of the type which may only be locked with the key inserted in the barrel of the lock and which is known as a "dead-bolt lock," the barrel 27 of which extends inwardly of the box, the lock being held in place by means of lock retainer 29.

Door 11 is further provided with a rectangular aperture 33, which is shown in FIG. 1 and in dotted lines in FIG. 5 and which is preferably located centrally of the door underneath the lock. Secured by spot welding or other means to the interior face of the door is a guide channel 35, which extends laterally between the vertical edges of the door. The channel is in register with rectangular aperture 33, i.e. the upper and lower interior edges of the channel web are situated just above and below the aperture's edges, respectively. One end of the web of channel 35 is provided with a longitudinal slot 37 through which extends a handle 39 of signal plate 41, the plate being guided laterally in guide 35 to either of the two positions shown in dotted lines in FIG. 5. The signal plate which may be made of metal, plastic or any suitable material, is provided with a rectangular indicating portion 43 corresponding in dimensions to the aperture 33. The indicating portion is painted with a distinctive color, preferably red, although any other color may be used, so that it may be easily spotted by the service center's attendant. The signal 41 may be moved into a position wherein the painted color portion 43 will be aligned with aperture 33, so that it is visible exteriorly of the door, or it may be moved in the direction of arrow B (FIG. 5), so that the signal portion is hidden behind door 11 and a neutral portion of the signal which may correspond to the exterior color of the door, will be aligned with aperture 33. To prevent the displacement of the signal after it is set in a desired position, there is provided a projecting strip 45 extending inwardly of each box from bottom panel 10, which engages with the handle 39. Thus, the handle may be moved to the extreme right or left positions only when the door is open, and is held in either position when the door is closed. There is additionally provided, as shown in FIG. 5, a legend on the interior face of the door, instructing the customer to slide the handle to the right, that is, into a position of the signal portion corresponding to aperture 33.

Platform 2 is provided with an extension 47 which serves as a writing support, and there is secured conveniently thereto by means of a chain a pencil or pen 49. The desk also serves to hold a pad of customers' orders 51.

The device according to the invention is employed as follows:

A person desiring to have his car or other vehicle serviced and who has previously subscribed to a plan for automatic servicing, according to the invention, is provided with a key to a designated lock box. The key bears the number shown on plate 17 of the box. The subscriber is assigned a specified location in the parking area adjacent to the service center which corresponds to the location number indicated on plate 21 of the box. Upon arriving at the parking area, the subscriber places his car at the location assigned to him and after parking the car, proceeds to the assigned lock box. After describing on one of the customers' order forms 51 the nature and items of service desired, the customer unlocks his box which corresponds to his key number and swings door 11 open. He then places the order and his car key in the box and following the directions of the legend on the inner face of the door, slides signal 41 to the right by means of handle 39, thereby aligning the colored portion of the signal with aperture 33. Thus, the customer is prevented from accidentally leaving keys in the box. The customer then locks the box by swinging the door upwardly, turning the key to locked position and removing it from the box. The customer then leaves the parking area and proceeds to his destination.

A little later, or at a specified time, one of the service attendants who is provided with a master key to all the lock boxes inspects each battery unit and unlocks the box or boxes in which the red signal portion 43 is visible through aperture 33 and removes the customer's order and car keys. The attendant next slides the indicating signal to the left or the neutral position, so that the colored portion 43 is no longer visible through the aperture 33 and only the neutral part of the signal shows therein. He then locks the box in a manner previously described. Noting the location number on the box, the attendant proceeds to the corresponding location in the parking area and takes the car or other vehicle to the service center for required service. In performing the service, the attendant is guided by the instructions on the customer's order. A bill for the services is made out in the customer's name. Upon completing the servicing of the car, as requested, the attendant returns the former to its original location in the parking area and proceeds to the customer's box which he unlocks and wherein he places the keys and customer's copy of his order, finally locking the box again.

Some time later, or at the end of the work day, the customer, upon returning to the parking area for his car, proceeds to his box and, after opening it, takes out the customer's car key and the customer's order copy and locks the now empty box. The order copy thus indicates what services were rendered and the amount charged therefor. A bill for services is rendered by the service company at a later date by mail.

It will thus be readily observed that the entire procedure takes place without requiring personal contact or any discussions between the customer and the service attendant. The employment of the device, therefore, effects a substantial saving in time for the customer and the service personnel, since the latter are not constantly interrupted by newly arriving customers and are, therefore, able to devote their attention uninterruptedly to the work at hand, while making their inspection of the boxes when time permits or at stated intervals. Similarly, the customer may proceed to his destination almost immediately upon arrival and without delay. Additionally, the patron need not take time to pay the bill for services rendered the same day, but having a charge account, may mail a check therefor at his convenience after receiving a bill by mail.

What I claim is:

A device for the automatic servicing of motor vehicles according to service subscribers' written orders, each of said subscribers and the service center being provided with a key for using the device, comprising in combination, a support, a plurality of individual compartments for depositing the orders, secured on said support, each of said compartments provided with a hinged door, an inwardly protruding detent extension, and a lock for locking the door, a rectangular aperture in each of said doors, a guide channel secured to the interior face of each of said doors and extending laterally behind said aperture, a signal plate slidable in said channel, said plate provided with a distinct color portion adapted to be locked in permanent visible position for indicating the presence of a subscriber's order in a given compartment and an indistinct color portion corresponding to that of the door, a manipulating handle secured to one end of said signal plate, said handle adapted to be held by said detent extension on one or the other end thereof when the door is locked, locator means on each of said doors for designating the motor vehicle's location, and compartment number indicia corresponding to the number on the subscriber's key.

References Cited in the file of this patent

UNITED STATES PATENTS

| | | |
|---|---|---|
| 347,638 | Pettit | Aug. 17, 1886 |
| 1,174,985 | Jahn | Mar. 14, 1916 |
| 2,047,454 | Anderson | July 14, 1936 |
| 2,257,323 | Baxter | Sept. 30, 1941 |
| 2,658,667 | Mirkin | Nov. 10, 1953 |